US012643263B2

(12) United States Patent
Seto

(10) Patent No.: US 12,643,263 B2
(45) Date of Patent: Jun. 2, 2026

(54) β GALLIUM OXIDE SUBSTRATE MANUFACTURING METHOD

(71) Applicant: DISCO CORPORATION, Tokyo (JP)

(72) Inventor: Yuya Seto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 71 days.

(21) Appl. No.: 18/765,505

(22) Filed: Jul. 8, 2024

(65) Prior Publication Data

US 2025/0033245 A1     Jan. 30, 2025

(30) Foreign Application Priority Data

Jul. 24, 2023     (JP) .................................. 2023-119568

(51) Int. Cl.
*B28D 5/00*          (2006.01)
*B23K 26/364*     (2014.01)

(52) U.S. Cl.
CPC .......... *B28D 5/0011* (2013.01); *B23K 26/364* (2015.10); *B28D 5/0052* (2013.01)

(58) Field of Classification Search
CPC ......... H01L 21/70; H01L 21/77; H01L 21/78; B23K 26/062; B23K 26/34; B23K 26/352; B23K 26/36; B23K 26/362; B23K 26/364; B23K 26/046; B23K 26/044; B23K 26/042; B23K 26/035; B23K 26/03; B23K 26/02; B23K 15/0013; B23K 15/00; B28D 5/0052;

B28D 5/0058; B28D 5/0082; B28D 5/0094; B28D 5/0035; B28D 5/0023; B28D 5/0017; B28D 5/0011; B28D 5/0005; B28D 5/00
See application file for complete search history.

(56) References Cited

U.S. PATENT DOCUMENTS

2018/0254223 A1* 9/2018 Hirata .................. B23K 26/082
2022/0246474 A1* 8/2022 Miyake ................. H01L 21/479
2022/0339740 A1* 10/2022 Bernard ............. B23K 26/0624

FOREIGN PATENT DOCUMENTS

JP          20057254174 A     10/2007
JP          2016013929 A     1/2016

* cited by examiner

*Primary Examiner* — Cedrick S Williams
(74) *Attorney, Agent, or Firm* — Greer, Burns & Crain, Ltd

(57)          ABSTRACT

A β gallium oxide substrate manufacturing method for manufacturing a substrate from a workpiece formed of β gallium oxide includes a separation layer forming step of applying a laser beam of such a wavelength as to be transmitted through the β gallium oxide to the workpiece, with a focal point of the laser beam positioned at a predetermined depth from a front surface of the workpiece, to thereby form a separation layer including a modified part and a crack extending from the modified part, inside the workpiece, and a separation step of exerting an external force on the workpiece to thereby separate the substrate from the workpiece with the separation layer as a start point, after the separation layer forming step.

2 Claims, 6 Drawing Sheets

ANGLE FORMED BY SCANNING DIRECTION OF LASER BEAM RELATIVE TO STRAIGHT
LINE PARALLEL TO CRYSTAL ORIENTATION [100] OF β GALLIUM OXIDE (° )

β GALLIUM OXIDE SUBSTRATE MANUFACTURING METHOD

BACKGROUND OF THE INVENTION

Field of the Invention

The present invention relates to a β gallium oxide substrate manufacturing method for manufacturing a substrate from a workpiece formed of β gallium oxide.

Description of the Related Art

In gallium oxide ($Ga_2O_3$) having crystal polymorphism, the monoclinic β phase (B gallium oxide: $β$-$Ga_2O_3$) is the most stable phase. The β gallium oxide is a wide-gap semiconductor of which the band gap is approximately 4.8 eV (see, for example, Japanese Patent Laid-open No. 2007-254174). Hence, the β gallium oxide is expected as a blank material for semiconductor devices such as power devices. In general, semiconductor devices are formed by use of a disk-shaped substrate. The substrate is manufactured, for example, by cutting a workpiece such as a cylindrical block called an ingot in such a manner that a part having a predetermined thickness included in the workpiece is separated from the workpiece by use of a wire saw (see, for example, Japanese Patent Laid-open No. 2016-13929).

SUMMARY OF THE INVENTION

For the formation of semiconductor devices, for example, a substrate having a thickness of approximately 150 μm is used. In addition, the thickness of the wire saw is, for example, approximately 300 μm. Hence, in the case of manufacturing the substrate from the workpiece by use of the wire saw, 60% to 70% of the workpiece is discarded as cutting allowance, so that the productivity is low.

In view of this, it is an object of the present invention to provide a β gallium oxide substrate manufacturing method by which it is possible to enhance productivity in manufacturing a substrate from a workpiece formed of β gallium oxide.

In accordance with an aspect of the present invention, there is provided a β gallium oxide substrate manufacturing method for manufacturing a substrate from a workpiece formed of β gallium oxide. The method includes a separation layer forming step of applying a laser beam of such a wavelength as to be transmitted through the β gallium oxide to the workpiece, in a state in which a focal point where the laser beam is concentrated is positioned at a predetermined depth from a front surface of the workpiece, to form a separation layer including a modified part and a crack extending from the modified part, inside the workpiece, and a separation step of exerting an external force on the workpiece to thereby separate the substrate from the workpiece, with the separation layer as a start point, after the separation layer forming step.

Further, in the present invention, it is preferable that the workpiece be manufactured in such a manner that a crystal plane {001} of the β gallium oxide is exposed on the front surface, and that, in the separation layer forming step, application of the laser beam to the workpiece while the workpiece and the focal point are moved relative to each other in a predetermined direction forming an angle of not more than 35° relative to a straight line parallel to a crystal orientation [100] of the β gallium oxide and relative movement, in a direction orthogonal to the predetermined direction, of the workpiece and a position where the focal point is formed be alternately repeated. In addition, it is preferable that the β gallium oxide substrate manufacturing method of the present invention further include a preliminary separation layer forming step of applying the laser beam to the workpiece in such a manner that the focal point is positioned at the predetermined depth from the front surface of the workpiece, to thereby form a preliminary separation layer including a preliminary modified part and a preliminary crack extending from the preliminary modified part, inside the workpiece, and a specifying step of referring to an extending direction of the preliminary crack to thereby specify the predetermined direction, after the preliminary separation layer forming step but before the separation layer forming step.

In the present invention, after the separation layer including the modified part and the crack extending from the modified part is formed inside the workpiece, the substrate is separated from the workpiece with the separation layer as a start point. As a result, the productivity of the substrate can be enhanced, as compared to the case of manufacturing the substrate from the workpiece by use of a wire saw.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
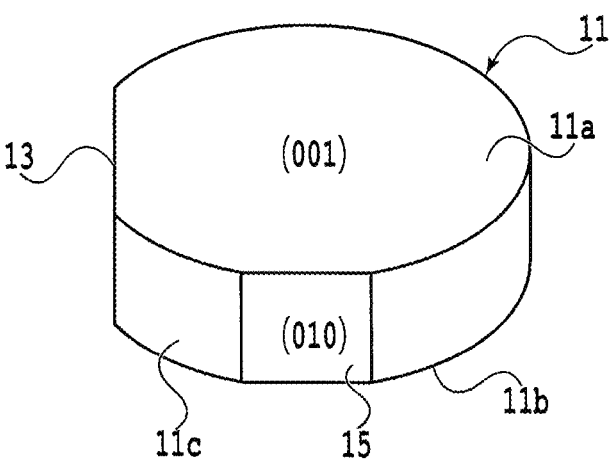
FIG. 1A is a perspective view schematically depicting an example of an ingot formed of β gallium oxide.
FIG. 1B is a side view schematically depicting the ingot depicted in FIG. 1A.
Figure 1:
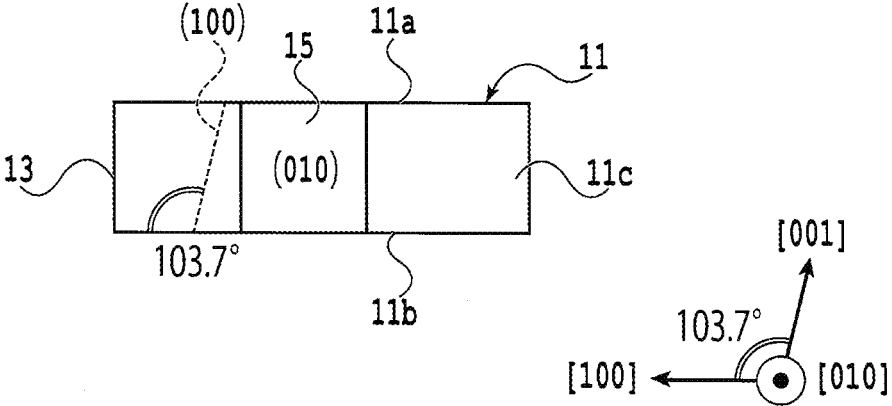

An embodiment of the present invention will be described with reference to the attached drawings. FIG. 1A is a perspective view schematically depicting an example of an ingot formed of β gallium oxide. FIG. 1B is a side view schematically depicting the ingot depicted in FIG. 1A. Note that, in FIGS. 1A and 1B, crystal planes of the β gallium oxide included in the ingot are also depicted. In addition, in FIG. 1B, crystal orientations of the β gallium oxide are also depicted.

The crystal structure of β gallium oxide is a monocline in which the angle formed between a crystal orientation [100] (a-axis) and a crystal orientation [001] (c-axis) is 103.7° and the angles formed between a crystal orientation [010] (b-axis) and respective ones of the crystal orientation [100] (a-axis) and the crystal orientation [001] (c-axis) are 90°. An ingot 11 depicted in FIGS. 1A and 1B has a front surface 11a and a back surface 11b which are parallel to each other, and a crystal plane {001} is exposed on the respective ones of the front surface 11a and the back surface 11b (here, for convenience' sake, the plane exposed on the front surface 11a is made to be the crystal plane (001)).

Note that, while the ingot 11 is manufactured in such a manner that the crystal plane {001} is exposed on the respective ones of the front surface 11a and the back surface 11b, a plane slightly inclined from the crystal plane {001} may be exposed on the respective ones of the front surface 11a and the back surface 11b, due to a processing error or the like during manufacture. Specifically, a plane having an angle of not more than 1° relative to the crystal plane {001} may be exposed on the respective ones of the front surface 11a and the back surface 11b of the ingot 11.

In addition, a side surface 11c of the ingot 11 is formed with two flat parts, namely, a primary orientation flat 13 and a secondary orientation flat 15 that indicate crystal orientations of the β gallium oxide. The primary orientation flat 13 is longer than the secondary orientation flat 15, and is formed in such a manner as to be positioned in the crystal orientation as viewed from the center of the ingot 11.

Besides, the secondary orientation flat 15 is formed in such a manner as to be positioned in the crystal orientation [010] as viewed from the center of the ingot 11. In other words, the secondary orientation flat 15 is formed in such a manner as to be a plane on which the crystal plane (010) is exposed. Hence, in the ingot 11, a crystal plane (100) has an obtuse angle of 103.7° relative to the front surface 11a or the back surface 11b, and is orthogonal to the secondary orientation flat 15.

Note that one of or both the primary orientation flat 13 and the secondary orientation flat 15 may not be formed in the side surface 11c of the ingot 11. In addition, the side surface 11c of the ingot 11 may be formed with a notch or notches that indicate the crystal orientation or orientations of the β gallium oxide, in place of the primary orientation flat 13 and the secondary orientation flat 15.

Figure 2:
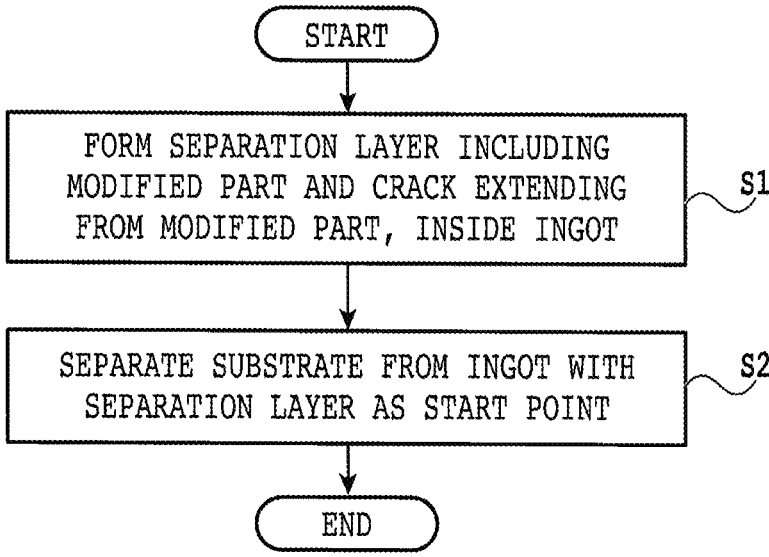
FIG. 2 is a flow chart schematically depicting an example of a β gallium oxide substrate manufacturing method for manufacturing a substrate from the ingot depicted in FIGS. 1A and 1B.

FIG. 2 is a flow chart schematically depicting an example of the β gallium oxide substrate manufacturing method for manufacturing a substrate from the ingot 11 which is the workpiece. In this method, first, a separation layer including a modified part and a crack extending from the modified part is formed inside the ingot 11 (separation layer forming step S1).

Figure 3:
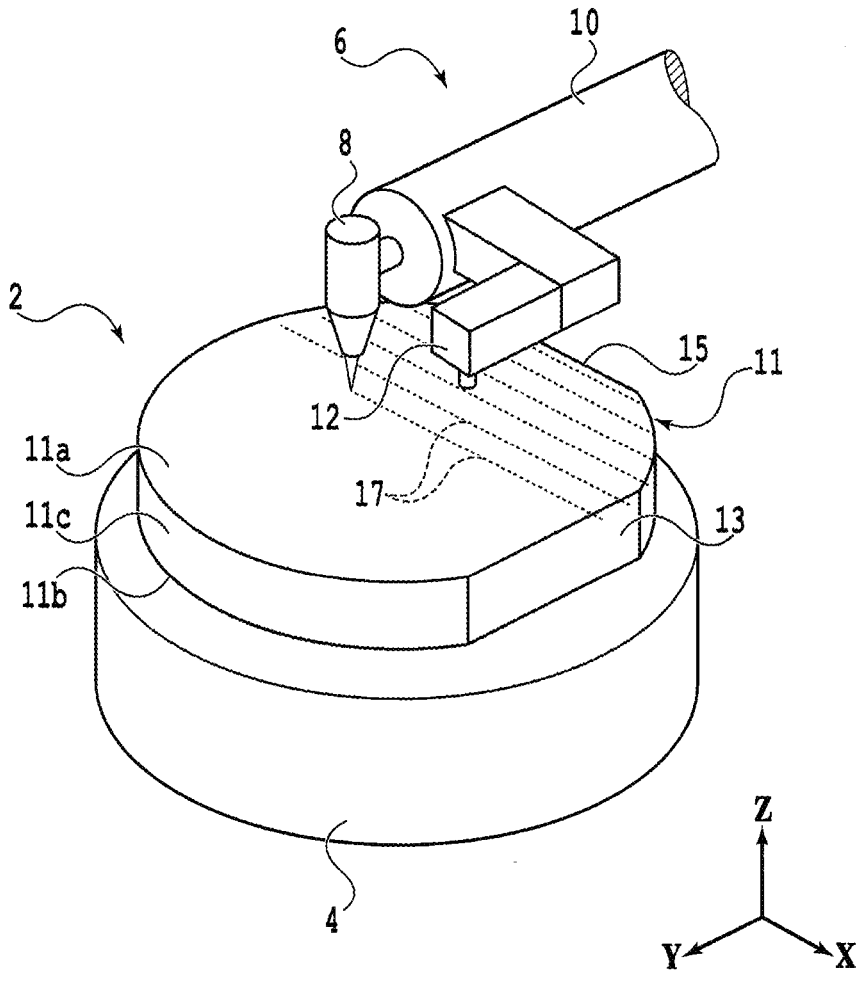
FIG. 3 is a perspective view schematically depicting a manner of a separation layer forming step depicted in FIG. 2.

FIG. 3 is a perspective view schematically depicting a manner of the separation layer forming step S1. Note that an X-axis direction and a Y-axis direction indicated in FIG. 3 are directions which are orthogonal to each other on a horizontal plane, and a Z-axis direction is a direction (vertical direction) that is orthogonal to both the X-axis direction and the Y-axis direction.

The separation layer forming step S1 is carried out by a laser processing apparatus 2. The laser processing apparatus 2 includes a chuck table 4 that has a circular holding surface substantially parallel to a horizontal plane and that can hold the ingot 11 on the holding surface.

The chuck table 4 is connected to a suction mechanism (not illustrated). The suction mechanism has, for example, an ejector or the like. When the suction mechanism is operated, a suction force acts in a space in the vicinity of the holding surface of the chuck table 4. Hence, when the suction mechanism is operated in a state in which the ingot 11 is placed on the holding surface, the ingot 11 is held on the holding surface of the chuck table 4.

In addition, the chuck table 4 is connected to a rotating mechanism (not illustrated). The rotating mechanism has, for example, a pulley, a motor, and the like. When the rotating mechanism is operated, the chuck table 4 is rotated, with a straight line passing through the center of the holding surface and extending along the Z-axis direction as a rotational axis. For example, the rotating mechanism rotates the chuck table 4 in such a manner that the secondary orientation flat 15 of the ingot 11 held on the holding surface of the chuck table 4 becomes parallel to the X-axis direction.

On the upper side of the chuck table 4, a head 8 of a laser beam applying unit 6 is provided. The head 8 is provided at a tip part of a cylindrical housing 10 extending along the Y-axis direction. Note that the head 8 accommodates an optical system such as a condenser lens (for example, a condenser lens having a numerical aperture (NA) of 0.85) and a mirror, whereas the housing 10 accommodates an optical system such as a mirror and/or a lens.

A base end part of the housing 10 is connected to a moving mechanism. The moving mechanism has, for example, a ball screw, a motor, and the like. When the moving mechanism is operated, the housing 10 is moved along the X-axis direction, the Y-axis direction, and/or the Z-axis direction. In addition, the laser beam applying unit 6 has, for example, a laser oscillator (not illustrated) including Nd:YAG or the like as a laser medium.

The laser oscillator generates a pulsed laser beam of such a wavelength (for example, 1064 nm) as to be transmitted through the β gallium oxide (for example, a pulsed laser beam having a frequency of 30 kHz and a pulse width of 4 ns). The laser beam is subjected to adjustment of its output (power) by an attenuator, and is thereafter emitted from the head 8 directly downward through the optical systems accommodated in the housing 10 and the head 8.

Further, at a side part of the housing 10, an imaging unit 12 capable of imaging a region directly below the imaging unit 12 is provided. The imaging unit 12 has, for example, a light source such as a light emitting diode (LED) that emits light of such a wavelength as to be transmitted through the β gallium oxide (for example, visible light), an objective lens, and an imaging element such as a charge coupled device (CCD) image sensor and a complementary metal oxide semiconductor (CMOS) image sensor.

In carrying out the separation layer forming step S1 by the laser processing apparatus 2, first, the ingot 11 is placed on the holding surface of the chuck table 4 in such a manner that the front surface 11a is oriented upward. Next, the suction mechanism is operated in such a manner that the ingot 11 is held by the chuck table 4. Subsequently, the imaging unit 12 is operated to form an image of the front surface 11a of the ingot 11.

Next, with reference to this image, the rotating mechanism rotates the chuck table 4 in such a manner that, for example, the secondary orientation flat 15 becomes parallel to the X-axis direction. In other words, the rotating mechanism rotates the chuck table 4 in such a manner that the crystal orientation [100] of the β gallium oxide becomes parallel to the X-axis direction and that the crystal orientation [010] becomes parallel to the Y-axis direction.

Next, the moving mechanism moves the housing 10 along the X-axis direction and/or the Y-axis direction in such a manner that a region of the ingot 11, the region being slightly spaced to the inner side from the secondary orientation flat 15, is positioned in the X-axis direction as viewed from the head 8 in plan view.

Subsequently, the moving mechanism moves the housing 10 along the Z-axis direction in such a manner that the focal point where the laser beam emitted from the head 8 is concentrated is positioned at a predetermined depth from the front surface 11a of the ingot 11. Note that the predetermined depth corresponds, for example, to the thickness of the substrate to be manufactured from the ingot 11.

Next, while the laser beam is being emitted from the head 8, the moving mechanism moves the housing 10 along the X-axis direction in such a manner that the focal point where the laser beam is concentrated passes from one end to the other end in the X-axis direction of the ingot 11 at a predetermined speed (for example, 450 mm/s). In other words, the laser beam is applied to the ingot 11, with a direction along a straight line parallel to the crystal orientation of the β gallium oxide as a scanning direction of the laser beam.

As a result, a modified part 17 where the crystal structure of the β gallium oxide is disordered is formed inside the ingot 11, with the focal point where the laser beam is concentrated as a center. In addition, when the modified part 17 is formed inside the ingot 11, the volume of the ingot 11 expands, and an internal stress is generated in the ingot 11. The internal stress is relaxed by extension of a crack from the modified part 17.

Note that, in the β gallium oxide, the crystal plane (100) is most easily cleaved, and the crystal plane (001) is second most easily cleaved. Hence, when the modified part 17 is formed inside the ingot 11, many cracks extending along the crystal plane (100) and the crystal plane (001) are formed. As a result, a separation layer including the modified part 17 and the cracks extending from the modified part 17 is formed inside the ingot 11 (specifically, in a rectilinear region along the crystal orientation [100] of the β gallium oxide).

Next, the moving mechanism moves the housing 10 by a predetermined index amount (for example, 0.2 mm) along the Y-axis direction in such a manner that the head 8 is positioned in the X-axis direction in plan view as viewed from a region slightly farther from the secondary orientation flat 15 than a region which has already been irradiated with the laser beam.

Subsequently, the application of the laser beam to the ingot 11 as described above is carried out, with a direction opposite to the X-axis direction as the scanning direction of the laser beam. Further, the above-mentioned operations are repeated until the application of the laser beam to a region of the ingot 11, the region being the farthest from the secondary orientation flat 15, is completed.

In other words, the relative movement of the ingot 11 and the position for formation of the focal point where the laser beam is concentrated (specifically, movement of the housing 10) along the Y-axis direction and the application of the laser beam to the ingot 11 with the X-axis direction or the direction opposite to the X-axis direction as the scanning direction of the laser beam are alternately repeated. As a result, the separation layer forming step S1 is completed.

Note that, in the above-described separation layer forming step S1, the direction parallel to the crystal orientation [100] of the β gallium oxide (the X-axis direction or the direction opposite to the X-axis direction) is set as the scanning direction of the laser beam, but a direction non-parallel to the crystal orientation [100] may be set as the scanning direction of the laser beam.

It is to be noted, however, that, when the scanning direction of the laser beam is parallel to the crystal orientation [010] of the β gallium oxide, the proportion of the cracks extending along the crystal plane (100) parallel to the crystal orientation [010] may increase. In a case where the proportion of the cracks extending along the crystal plane (100) increases, the thickness of the separation layer formed inside the ingot 11 increases, and the productivity in the manufacture of the substrate from the ingot 11 is lowered.

In addition, in this case, the proportion of the cracks extending along the crystal plane (001), that is, the cracks extending in parallel to the front surface 11a of the ingot 11, decreases, and, hence, the width of the separation layer (the length of the separation layer in a direction orthogonal to both the thickness direction of the ingot 11 and the scanning direction of the laser beam) formed inside the ingot 11 is reduced. Hence, in this case, the above-mentioned index amount should be reduced, and the through-put in the laser processing apparatus 2 is lowered.

Taking these points into account, for enhancing the productivity and the through-put in manufacturing the substrate from the ingot 11, it is preferable to set the scanning direction of the laser beam in such a manner that the angle formed relative to a straight line parallel to the crystal orientation [010] of the β gallium oxide is enlarged, that is, that the angle formed relative to a straight line parallel to the crystal orientation [100] is reduced.

Figure 4:
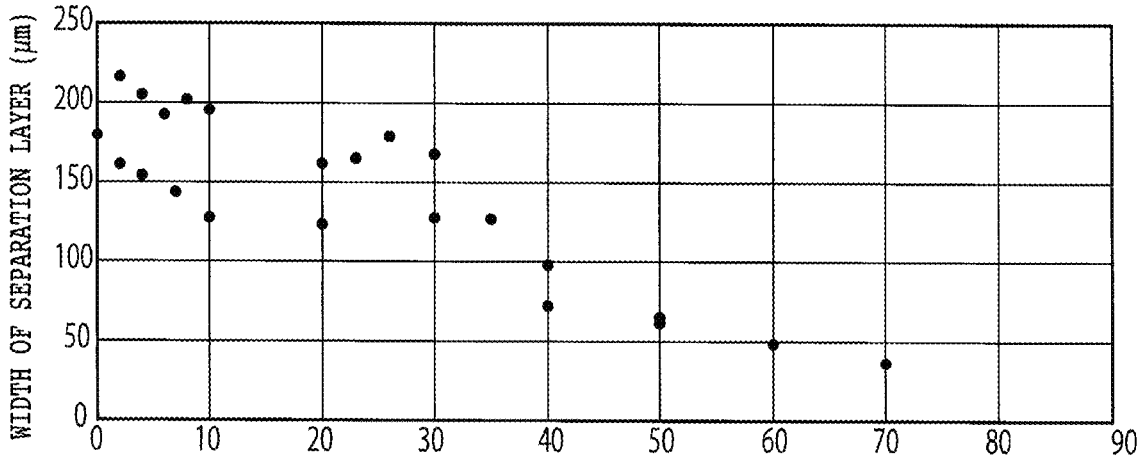
FIG. 4 is a graph depicting a relation between an angle formed by a scanning direction of a laser beam relative to a straight line parallel to a crystal orientation [100] of the β gallium oxide and a width of a crack in a direction orthogonal to the scanning direction of the laser beam.

FIG. 4 is a graph depicting the widths of the separation layers formed when the laser beam is applied under a plurality of conditions different in the scanning direction relative to a workpiece formed of the β gallium oxide which is manufactured in such a manner that the crystal plane (001) is exposed on the front surface. Specifically, in FIG. 4, there is depicted a relation between the angle formed by the scanning direction of the laser beam relative to a straight line parallel to the crystal orientation [100] of the β gallium oxide and the width of the separation layer.

As depicted in FIG. 4, the width of the separation layer is enlarged when the angle formed by the scanning direction of the laser beam relative to a straight line parallel to the crystal orientation [100] of the β gallium oxide is not more than 35°. Hence, in the separation layer forming step S1, it is preferable that the scanning direction of the laser beam be set in such a manner that the angle becomes not more than 35°. Further, with reference to FIG. 4, it is more preferable that the scanning direction of the laser beam be set in such a manner that the angle becomes not more than 10°, and it is most preferable that the scanning direction of the laser beam be set in such a manner that the angle becomes not more than 5°.

In addition, in the separation layer forming step S1, the application of the laser beam to the ingot 11 may be carried out only along one direction (for example, the X-axis direction). In other words, in the separation layer forming step S1, the application of the laser beam to the ingot 11 with the one direction adopted as the scanning direction of the laser beam, without adopting the direction opposite to the one direction (for example, the direction opposite to the X-axis direction) as the scanning direction of the laser beam, may be repeated.

Figure 5A:
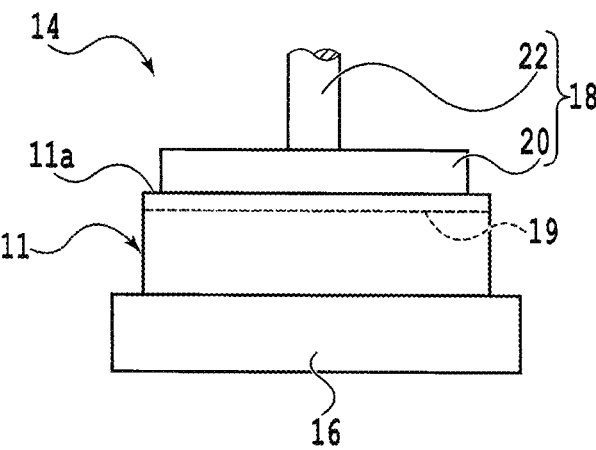
FIG. 5A is a side view schematically depicting a manner of a separation step depicted in FIG. 2.
Figure 5B:
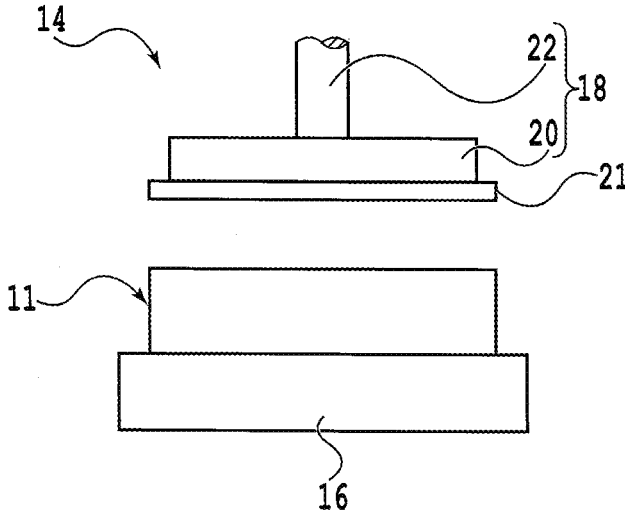
FIG. 5B is a side view schematically depicting the manner of the separation step depicted in FIG. 2.

After the separation layer forming step S1, the substrate is separated from the ingot 11, with the separation layer as a start point (separation step S2). FIGS. 5A and 5B are side views schematically depicting a manner of the separation step S2. The separation step S2 is carried out by a separating apparatus 14. The separating apparatus 14 includes a chuck table 16 that has a structure similar to that of the chuck table 4 depicted in FIG. 3.

The chuck table 16 is connected to a table-side suction mechanism (not illustrated). The table-side suction mechanism has, for example, a vacuum pump or the like. When the table-side suction mechanism is operated, a suction force acts in a space in the vicinity of a holding surface of the chuck table 16. Hence, when the table-side suction mechanism is operated in a state in which the ingot 11 is placed on the holding surface, the ingot 11 is held on the holding surface of the chuck table 16.

On the upper side of the chuck table 16, a separation unit 18 is provided. The separation unit 18 has a suction plate 20 of which a lower surface is formed with a plurality of suction ports. The plurality of suction ports communicate with a separation unit-side suction mechanism, such as a vacuum pump, through a suction channel formed inside the suction plate 20. When the separation unit-side suction mechanism is operated, a suction force acts in a space in the vicinity of the lower surface of the suction plate 20.

In addition, a vertical direction moving mechanism 22 is connected to an upper surface of the suction plate 20. The vertical direction moving mechanism 22 has, for example, a ball screw, a motor, and the like. When the vertical direction moving mechanism 22 is operated, the suction plate 20 is moved in the vertical direction.

In carrying out the separation step S2 by the separating apparatus 14, first, in a state in which the chuck table 16 and the suction plate 20 are sufficiently spaced from each other, the ingot 11 having a separation layer 19 formed in the inside thereof is placed on the holding surface of the chuck table 16 in such a manner that the front surface 11a of the ingot 11 is oriented upward. Next, the table-side suction mechanism is operated in such a manner that the ingot 11 is held by the chuck table 16.

Next, the vertical direction moving mechanism lowers the suction plate 20 in such a manner that the lower surface of the suction plate 20 is brought into contact with the front surface 11a of the ingot 11 (see FIG. 5A). Subsequently, the separation unit-side suction mechanism is operated in such a manner that the front surface 11a side of the ingot 11 is sucked upward. Next, the vertical direction moving mechanism raises the suction plate 20 in such a manner that the suction plate 20 is spaced away from the chuck table 16 (see FIG. 5B).

As a result, such an external force that separates the front surface 11a side and the back surface 11b side of the ingot 11 from each other is exerted on the ingot 11, whereby the cracks included in the separation layer 19 are further extended. Consequently, the ingot 11 is separated at the separation layer 19, and a substrate 21 is manufactured. By these operations, the separation step S2, that is, the substrate manufacturing method depicted in FIG. 2, is completed.

In the substrate manufacturing method depicted in FIG. 2, after the separation layer 19 including the modified part 17 and the cracks extending from the modified part 17 is formed inside the ingot 11, the substrate 21 is separated from the ingot 11, with the separation layer 19 as a start point. As a result, the productivity of the substrate 21 can be enhanced, as compared to the case of manufacturing the substrate 21 from the ingot 11 by use of a wire saw.

Note that the contents of the above description are one mode of the present invention, and the present invention is not limited to the contents of the above description. For example, in the separation layer forming step S1, it is sufficient if the ingot 11 and the focal point where the laser beam is concentrated can be moved relative to each other, and the structure therefor is not limited to any kind.

Specifically, the separation layer forming step S1 may be carried out by a laser processing apparatus provided therein with moving mechanisms for moving the chuck table 4 in the X-axis direction, the Y-axis direction, and/or the Z-axis direction.

Alternatively, the separation layer forming step S1 may be carried out by use of a laser processing apparatus having a laser beam applying unit 6 provided with a scanning optical system capable of changing the direction of a laser beam emitted from a head 8. Note that the scanning optical system includes, for example, a Galvano scanner, an acousto-optic device (AOD), a polygon mirror, and/or the like.

In addition, in the separation step S2, ultrasonic vibration may be applied to the ingot 11 as an external force for manufacturing the substrate 21. In other words, in the separation step S2, the ultrasonic vibration may be applied to the front surface 11a side of the ingot 11, in place of or prior to the exertion of such an external force that separates the front surface 11a side and the back surface 11b side of the ingot 11 from each other.

Besides, the workpiece to be used for the manufacture of the β gallium oxide substrate may be an ingot that is manufactured in such a manner that a crystal plane other than the crystal plane {001} (for example, the crystal plane (100)) of the β gallium oxide is exposed on the front surface.

In addition, the workpiece to be used for the manufacture of the β gallium oxide substrate may be, for example, a bare wafer that has a thickness of 2 to 5 times the thickness of the substrate to be manufactured. Note that the bare wafer is manufactured by separation from the ingot 11, for example, by a method similar to the above-described method. In this case, it can be expressed that the substrate is manufactured by repeating twice the above-described method.

Besides, the workpiece to be used for the manufacture of the β gallium oxide substrate may be a device wafer that is manufactured by forming semiconductor devices on one surface of the bare wafer. In this case, for preventing adverse influence of the laser beam on the semiconductor devices, the laser beam is preferably applied to the device wafer from a side of the device wafer on which side the semiconductor devices are not formed.

Figure 6:
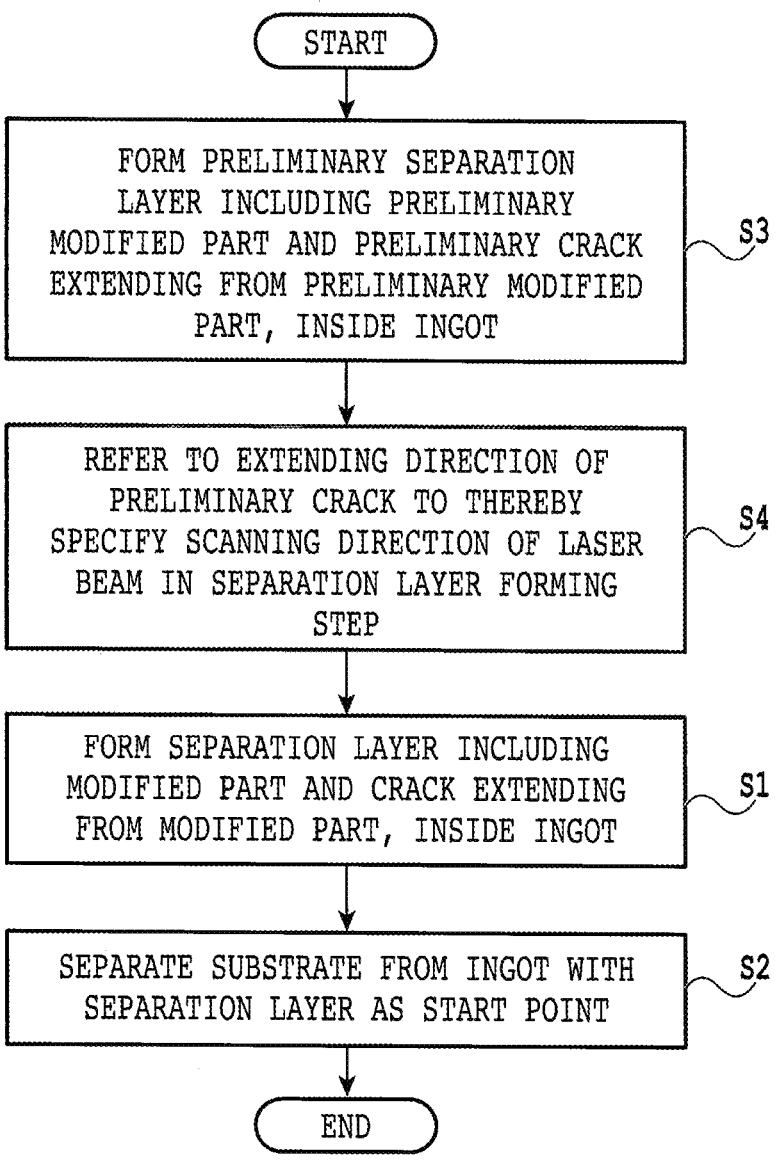
FIG. 6 is a flow chart schematically depicting an example of a β gallium oxide substrate manufacturing method for manufacturing a substrate from an ingot of which accurate crystal orientations are not preliminarily recognized.

In addition, the workpiece to be used for the manufacture of the β gallium oxide substrate may be an ingot which is manufactured in such a manner that the crystal plane {001} of the β gallium oxide is exposed on the front surface but the accurate crystal orientations of which are not preliminarily recognized. FIG. 6 is a flow chart schematically depicting an example of a β gallium oxide substrate manufacturing method for manufacturing a substrate from such a workpiece as just mentioned.

In this method, first, a preliminary separation layer including a preliminary modified part and preliminary cracks extending from the preliminary modified part is formed inside the ingot (preliminary separation layer forming step S3). The preliminary separation layer forming step S3 is carried out, for example, by the above-described laser processing apparatus 2.

In carrying out the preliminary separation layer forming step S3 by the laser processing apparatus 2, first, the ingot is placed on the holding surface of the chuck table 4 in such a manner that the front surface of the ingot is oriented upward. Next, the suction mechanism is operated in such a manner that the ingot is held by the chuck table 4. Subsequently, the moving mechanism moves the housing 10 along the X-axis direction and/or the Y-axis direction in such a manner that the head 8 is positioned directly above the ingot.

Next, the moving mechanism moves the housing 10 along the Z-axis direction in such a manner that the focal point where the laser beam emitted from the head 8 is concentrated is positioned at a predetermined depth from the front surface of the ingot. Note that the predetermined depth corresponds to the thickness of the substrate to be manufactured from the ingot.

Subsequently, the laser beam is emitted from the head 8. In this instance, the moving mechanism may or may not move the housing 10 in such a manner as to move the focal point where the laser beam is concentrated. As a result, the preliminary modified part in which the crystal structure of the β gallium oxide is disordered is formed inside the ingot, with the focal point where the laser beam is concentrated as a center.

In addition, when the preliminary modified part is formed inside the ingot, preliminary cracks extend from the preliminary modified part. Here, in the β gallium oxide, the crystal plane (100) is most easily cleaved. Hence, the preliminary cracks extend mainly along the crystal plane (100). As a result, the preliminary separation layer including the preliminary modified part and the preliminary cracks extending from the preliminary modified part is formed inside the ingot.

After the preliminary separation layer forming step S3 but before the separation layer forming step S1, the extending direction of the preliminary cracks is referred to, and the scanning direction of the laser beam in the separation layer forming step S1 is specified (specifying step S4). In the specifying step S4, first, the moving mechanism moves the housing 10 along the X-axis direction and/or the Y-axis direction in such a manner that the imaging unit 12 is positioned directly above the preliminary separation layer.

Next, the imaging unit 12 is operated to form an image of the preliminary separation layer. In other words, the preliminary separation layer is imaged from a direction orthogonal to the crystal plane (001) of the β gallium oxide. In a case where the preliminary cracks included in the preliminary separation layer extend along the crystal plane (100), the preliminary cracks are included in the image mainly as cracks extending in parallel to the crystal orientation [010].

Subsequently, the extending direction of the preliminary cracks in this image is referred to, and such a direction that is orthogonal to the extending direction is specified as the scanning direction of the laser beam in the separation layer forming step S1. As a result, a direction having an angle of not more than 35° relative to a straight line parallel to the crystal orientation [100] of the β gallium oxide can be specified as the scanning direction of the laser beam.

Other than the above-mentioned points, structures, methods, and the like concerning the above-described embodiment can be modified as required in carrying out the present invention insofar as the modifications do not depart from the scope of the object of the invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A β gallium oxide substrate manufacturing method for manufacturing a substrate from a workpiece formed of β gallium oxide, wherein the workpiece is manufactured in such a manner that a crystal plane {001} of the β gallium oxide is exposed on a front surface of the workpiece, comprising:
a separation layer forming step of applying a laser beam of such a wavelength as to be transmitted through the β gallium oxide to the workpiece, in a state in which a focal point where the laser beam is concentrated is positioned at a predetermined depth from the front surface of the workpiece, to form a separation layer including a modified part and a crack extending from the modified part, inside the workpiece; and
a separation step of exerting an external force on the workpiece to thereby separate the substrate from the workpiece, with the separation layer as a start point, after the separation layer forming step;
in the separation layer forming step, application of the laser beam to the workpiece while the workpiece and the focal point are moved relative to each other in the predetermined direction forming an angle of not more than 35° relative to a straight line parallel to a crystal orientation [100] of the β gallium oxide and relative movement, in a direction orthogonal to the predetermined direction, of the workpiece and a position where the focal point is formed are alternately repeated.

2. The β gallium oxide substrate manufacturing method according to claim 1, further comprising:
a preliminary separation layer forming step of applying the laser beam to the workpiece in such a manner that the focal point is positioned at the predetermined depth from the front surface of the workpiece, to thereby form a preliminary separation layer including a preliminary modified part and a preliminary crack extending from the preliminary modified part, inside the workpiece; and
a specifying step of referring to an extending direction of the preliminary crack to thereby specify the predetermined direction, after the preliminary separation layer forming step but before the separation layer forming step.

* * * * *